United States Patent
Li et al.

(10) Patent No.: US 10,866,762 B2
(45) Date of Patent: Dec. 15, 2020

(54) UNBALANCED STORAGE RESOURCE USAGE CONFIGURATION FOR DISTRIBUTED STORAGE SYSTEMS

(71) Applicant: VMware, Inc., Palo Alto, CA (US)

(72) Inventors: Zongliang Li, Shanghai (CN); Wenguang Wang, Palo Alto, CA (US); Christian Dickmann, Munich (DE); Mansi Shah, Palo Alto, CA (US); Tao Xie, Shanghai (CN); Ye Zhang, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 8 days.

(21) Appl. No.: 16/045,394

(22) Filed: Jul. 25, 2018

(65) Prior Publication Data
US 2020/0034075 A1    Jan. 30, 2020

(51) Int. Cl.
*G06F 3/06* (2006.01)
*G06F 9/455* (2018.01)

(52) U.S. Cl.
CPC ............ *G06F 3/0659* (2013.01); *G06F 3/067* (2013.01); *G06F 3/0613* (2013.01); *G06F 9/455* (2013.01); *G06F 9/45558* (2013.01)

(58) Field of Classification Search
CPC .... G06F 3/0607; G06F 3/0613; G06F 3/0617; G06F 3/0631; G06F 3/0649; G06F 3/0659; G06F 3/067; G06F 9/455; G06F 9/45558

USPC .......................................... 711/154, 165, 170
See application file for complete search history.

(56) References Cited

U.S. PATENT DOCUMENTS

| | | | |
|---|---|---|---|
| 2010/0138677 A1* | 6/2010 | Pagan ................... | G06F 3/0625 713/320 |
| 2011/0153917 A1* | 6/2011 | Maita .................... | G06F 1/3225 711/103 |
| 2013/0111171 A1* | 5/2013 | Hirezaki ............... | G06F 3/0605 711/165 |
| 2015/0363123 A1* | 12/2015 | Bridge, Jr. .......... | G06F 11/3433 714/6.2 |

* cited by examiner

*Primary Examiner* — Gary J Portka
(74) *Attorney, Agent, or Firm* — Su IP Consulting

(57) ABSTRACT

Example methods are provided for unbalanced storage resource usage configuration for a distributed storage system in a virtualized computing environment. The method may comprise: obtaining usage data associated with multiple storage resources forming the distributed storage system; and based on the usage data, determining a higher usage set and a lower usage set from the multiple storage resources. The method also comprise configuring the multiple hosts to use the multiple storage resources in an unbalanced manner by using the higher usage set at a higher usage level compared to the lower usage set.

18 Claims, 8 Drawing Sheets

US 10,866,762 B2

UNBALANCED STORAGE RESOURCE USAGE CONFIGURATION FOR DISTRIBUTED STORAGE SYSTEMS

BACKGROUND

Unless otherwise indicated herein, the approaches described in this section are not admitted to be prior art by inclusion in this section.

Virtualization allows the abstraction and pooling of hardware resources to support virtual machines (VMs) in a virtualized computing environment, such as a Software-Defined Data Center (SDDC). For example, through server virtualization, virtualization computing instances such as VMs running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc.

In practice, storage resources are required by a VM to store data relating to the operating system and applications run by the VM, etc. In a distributed storage system, storage resources of a cluster of hosts may be aggregated to form a single shared pool of storage. VMs supported by the hosts within the cluster may then access the pool to store data. Conventionally, storage resources forming distributed storage system 190 are designed to be used in a balanced manner, which may have the undesirable effect of increasing the risk of a large-scale system failure.

DETAILED DESCRIPTION

Figure 1:
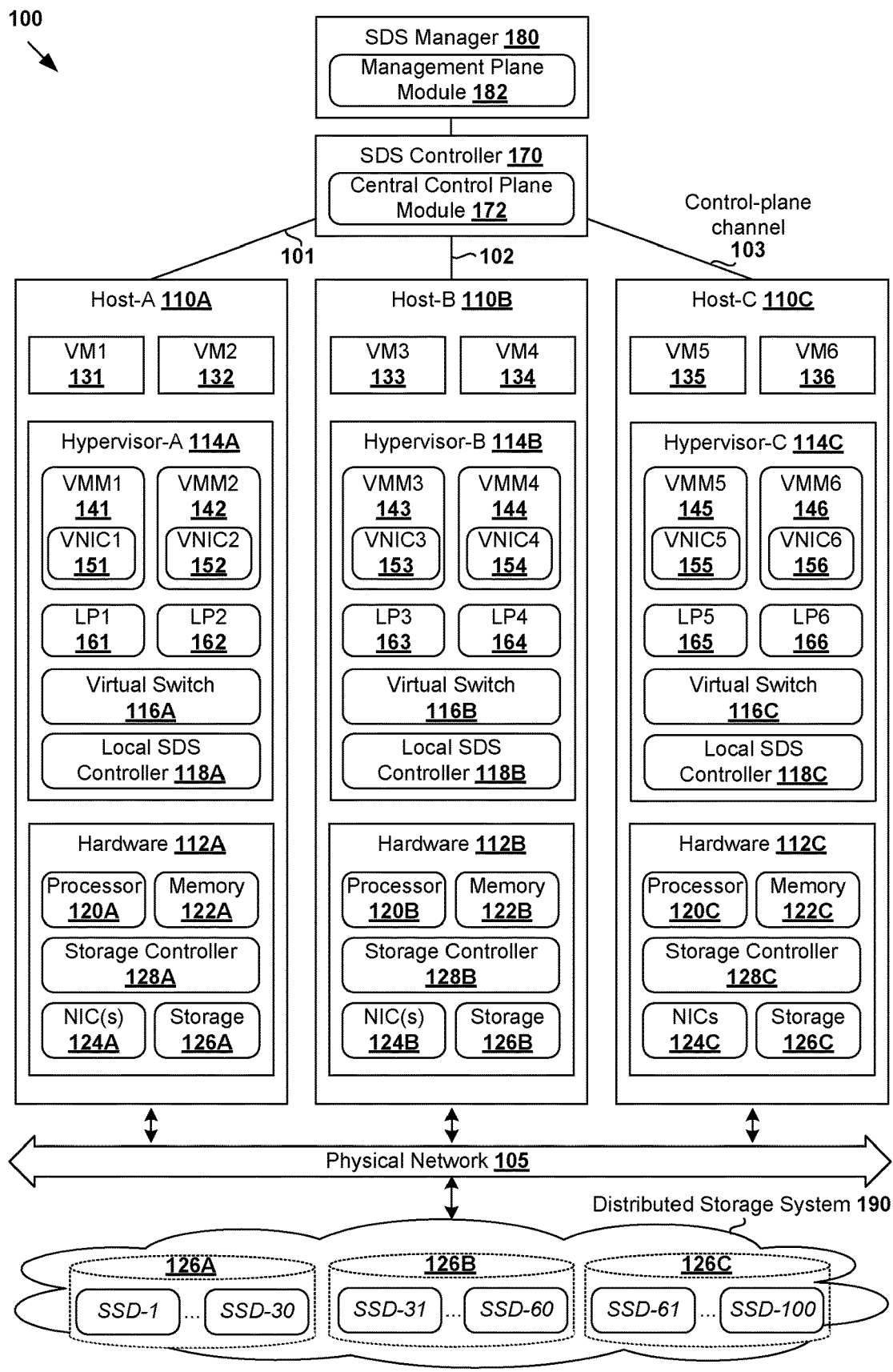
FIG. 1 is a schematic diagram illustrating an example virtualized computing environment in which unbalanced storage resource usage configuration may be performed for a distributed storage system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to distributed storage systems will now be explained in more detail using FIG. 1, which is a schematic diagram illustrating virtualized computing environment 100 in which unbalanced storage resource usage configuration may be performed for distributed storage system 190. It should be understood that, depending on the desired implementation, virtualized computing environment 100 may include additional and/or alternative components than that shown in FIG. 1.

In the example in FIG. 1, virtualized computing environment 100 includes multiple hosts, such as host-A 110A, host-B 110B and host-C 110C that are inter-connected via physical network 105. Each host 110A/110B/110C includes suitable hardware 112A/112B/112C and virtualization software (e.g., hypervisor-A 114A, hypervisor-B 114B, hypervisor-C 114C) to support various virtual machines (VMs) 131-136. For example, host-A 110A supports VM1 131 and VM2 132; host-B 110B supports VM3 133 and VM4 134; and host-C 110C supports VM5 135 and VM6 136. In practice, virtualized computing environment 100 may include any number of hosts (also known as a "host computers", "host devices", "physical servers", "server systems", "transport nodes," etc.), where each host may be supporting tens or hundreds of VMs.

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc. Hypervisor 114A/114B/114C may be implemented any suitable virtualization technology, such as VMware ESX® or ESXi™ (available from VMware, Inc.), Kernel-based Virtual Machine (KVM), etc. Hypervisor 114A/114B/114C may also be a "type 2" or hosted hypervisor that runs on top of a conventional operating system on host 110A/110B/110C.

Hypervisor 114A/114B/114C implements virtual switch 116A/116B to handle egress packets from, and ingress packets to, corresponding VMs 131-136 via respective logical ports 161-166. The term "logical port" may refer generally to a port on a logical switch to which a virtualized computing instance is connected. A "logical switch" may refer generally to a Software-Defined Networking (SDN) construct that is collectively implemented by virtual switches 116A-C in the example in FIG. 1, whereas a "virtual switch" may refer generally to a software switch or software implementation of a physical switch. In practice, there is usually a one-to-one mapping between a logical port on a logical switch and a virtual port on virtual switch 116A/116B/116C. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Hypervisor 114A/114B/114C also maintains a mapping between underlying hardware 112A/112B/112C and virtual resources allocated to respective VMs 131-136. Hardware 112A/112B/112C includes suitable physical components, such as central processing unit(s) or processor(s) 120A/120B/120C; memory 122A/122B/122C; physical network interface controllers (NICs) 124A/124B/124C; storage resource(s) 126A/126B/126C, storage controller(s) 128A/128B/128C to provide access to storage resource(s) 126A/126B/126C, etc. Virtual resources are allocated to each VM to support a guest operating system (OS) and applications (not shown for simplicity). For example, corresponding to hardware 112A/112B/112C, the virtual resources may include virtual CPU, guest physical memory (i.e., memory visible to the guest OS running in a VM), virtual disk, virtual network interface controller (VNIC), etc. Hardware resources may be emulated using virtual machine monitors (VMMs) 141-146, which may be considered as part of corresponding VMs 131-136, or alternatively, separated from VMs 131-136. In the example in FIG. 1, VNICs 151-156 are emulated by corresponding VMMs 141-146. Although one-to-one relationships are shown, one VM may be associated with multiple VNICs (each VNIC having its own network address).

In practice, storage controller 128A/128B/128C may be any suitable controller, such as redundant array of independent disks (RAID) controller (e.g., RAID-0 or RAID-1 configuration), etc. Each host 110A/110B/110C may include any suitable number of storage resources in the form of physical storage devices, drives or disks. Each physical storage resource may be housed in or directly attached to host 110A/110B/110C. Example physical storage resources include solid-state drives (SSDs), Universal Serial Bus (USB) flash drives, etc. For example, SSDs are gaining popularity in modern storage systems due to relatively high performance and affordability. Depending on the desired implementation, each SSD may include a high-speed interface connected to a controller chip and multiple memory elements.

To implement Software-Defined Storage (SDS) in virtualized computing environment 100, hosts 110A-C may be configured as a cluster. This way, hosts 110A-C may aggregate their storage resources 126A-C to form distributed storage system 190 that represents a shared pool of storage resources 126A-C. Distributed storage system 190 may employ any suitable technology, such as Virtual Storage Area Network (VSAN™) available from VMware, Inc. For example, hosts 110A-C may aggregate respective storage resources 126A-C into an "object store" (also known as a datastore or a collection of datastores). The object store represents a logical aggregated volume to store any suitable VM data relating to VMs 131-136, such as virtual machine disk (VMDK) objects, snapshot objects, swap objects, home namespace objects, etc. Any suitable disk format may be used, such as VM file system leaf level (VMFS-L), VSAN on-disk file system, etc. Distributed storage system 190 is accessible by hosts 110A-C via physical network 105.

SDS controller 170 and SDS manager 180 are example network management entities that facilitate configuration and management of distributed storage system 190 in virtualized computing environment 100. In the example in FIG. 1, SDS controller 170 and SDS manager 180 support central control plane (CCP) module 172 and management plane module 182, respectively. To send and receive control information (e.g., configuration information), each host 110A/110B/110C may implement local SDS controller 118A/118B/118C (also known as local control plane (LCP) agent) to interact with SDS controller 170 to perform configuration according to received control information. In practice, control-plane channel 101/102/103 may be established between SDS controller 170 and host 110A/110B/110C (e.g., using TCP over Secure Sockets Layer (SSL)) to facilitate the interaction. Management entity 170/180 may be implemented using physical machine(s), VM(s), a combination thereof, etc. Users (e.g., network administrators) may access the functionalities of the SDS manager and/or SDS controller via any suitable interface, such as graphical user interface, command-line interface, Application Programming Interface (API) calls.

Conventionally, storage resources 126A-C that form distributed storage system 190 are designed to be used in a balanced manner. In practice, storage resources 126A-C generally degrade with use and therefore have a limited lifespan. For example, SSDs may deteriorate as the number of read and erase events (e.g., program/erase (P/E) cycles) increases, and stop functioning once a particular P/E count is reached. As such, using storage resources 126A-C in a balanced manner has the undesirable effect of increasing the risk of storage resources 126A-C reaching their wear level limitation (e.g., P/E count) on the same day or at substantially the same time.

For example, distributed storage system 190 may be set up on the same day, usually with the same or similar type of drives (e.g., SSDs) that are manufactured at around the same time. When used in a balanced manner, there is a risk that storage resources 126A-C may fail and stop functioning at around the same time, such as on the same day. Although distributed storage system 190 is designed for fault tolerance, it generally cannot handle such a large-scale system failure. In some cases, users may be able to predict when storage resources 126A-C will reach their wear level limitation. However, it is challenging for the users to replace the whole system at once, such as due to time and budget issues, etc. This adversely affects the performance and availability of distributed storage system 190 in virtualized computing environment 100.

Unbalanced Storage Resource Usage Configuration

According to examples of the present disclosure, distributed storage system 190 may be implemented in an improved manner. Instead of necessitating balanced usage of storage resources 126A-C, an "unbalanced" approach for storage resource usage configuration may be implemented to reduce the risk of storage resources 126A-C failing at substantially the same time. Here, the term "unbalanced" may refer generally to a usage model in which storage resources are used at substantially different usage levels such that, for example, they do not reach their wear level limitation at substantially the same time. This way, the risk of a large-scale system failure may be reduced or avoided, thereby improving system performance and availability. In some examples, users may also plan for a staged hardware phase-out or replacement of storage resources 126A-C.

Figure 2:
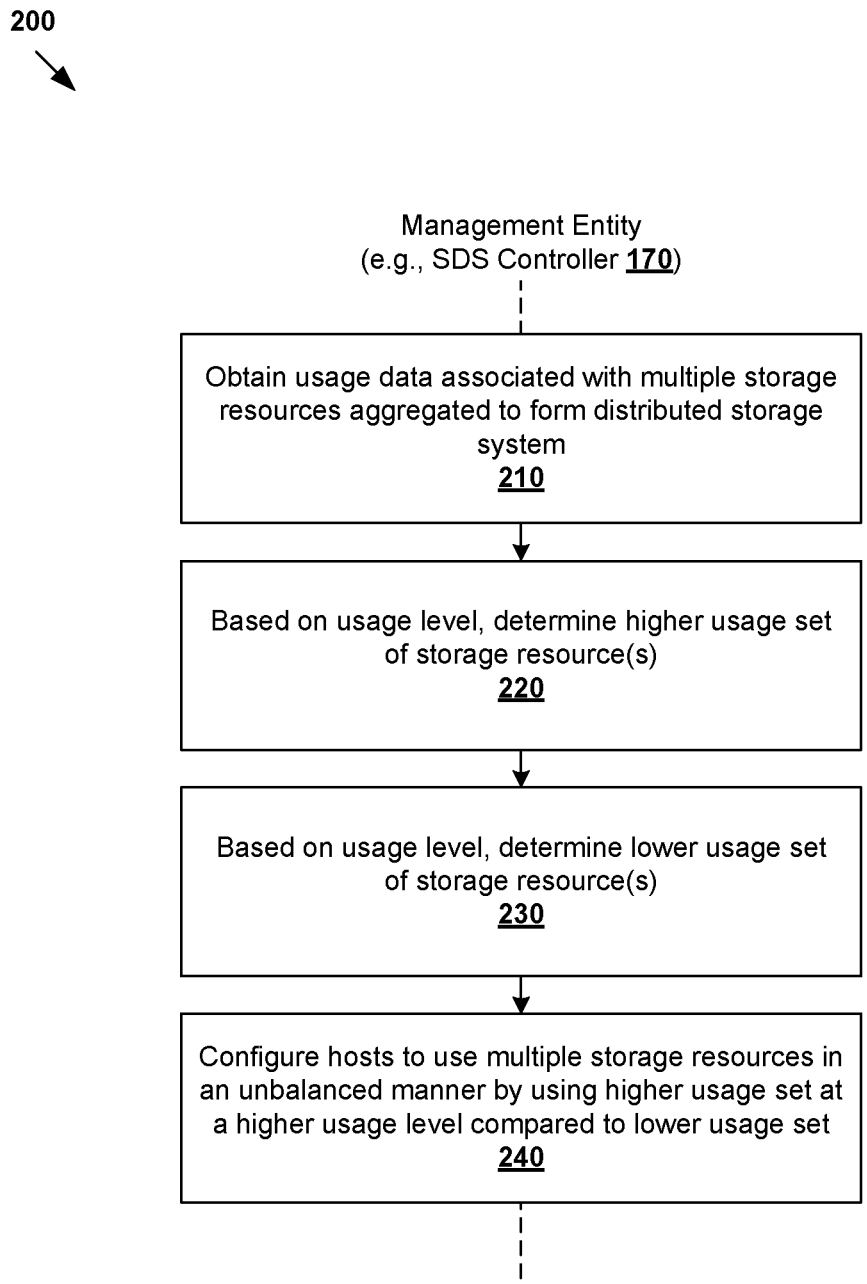
FIG. 2 is a flowchart of an example process for a management entity to perform unbalanced storage resource usage configuration for a distributed storage system in a virtualized computing environment.

In more detail, FIG. 2 is a flowchart of example process 200 for a management entity to perform unbalanced storage resource usage configuration for distributed storage system 190 in virtualized computing environment 100. Example process 200 may include one or more operations, functions, or actions illustrated by one or more blocks, such as 210 to 240. The various blocks may be combined into fewer blocks, divided into additional blocks, and/or eliminated depending on the desired implementation. In practice, examples of the present disclosure may be implemented by SDS controller 170 (e.g., using central control plane module 172), hosts 110A-C (e.g., using respective local controllers 118A-C), etc.

In the following, various examples will be explained using SDS controller 170 as an example "management entity," hosts 110A-C as example "hosts," storage resources 126A-C (e.g., SSDs) as example "storage resources," etc. FIG. 2 will be explained using FIG. 3, which is a schematic diagram illustrating example unbalanced resource usage configuration 300 for distributed storage system 190 in virtualized computing environment 100.

At 210 in FIG. 2, SDS controller 170 obtains usage data associated with multiple (N) storage resources 126A-C that are supported by hosts 110A-C and aggregated to form distributed storage system 190. In the example in FIG. 3, consider the scenario of N=100. Host-A 110A contributes storage resources (e.g., SSDs) labelled "SSD-1" to "SSD-30" to distributed storage system 190, while host-B 110B contributes "SSD-31" to "SSD-60" and host-C 110C contributes "SSD-61" to "SSD-100."

As used herein, the term "usage data" may refer generally to any suitable data relating to the hardware limitation of the storage resources, such as wear level count, P/E count limit, etc. Depending on the desired implementation, the usage data may include statistics relating to used space, free space, input output (I/O) load, data placement policy, etc. In practice, the term "wear level" may refer generally to various measures that are indicative of the quality of memory cells of a storage resource. In practice, memory cells that are aged and whose storage resource has deteriorated considerably will have a high wear level. High wear level is usually associated with intensive use (e.g., high number of P/E counts), which leads to poorer data storage reliability (e.g., high read error probability, etc.). When the usage data includes wear level data, examples of the present disclosure may be referred to as a wear-levelling-aware approach for storage resource configuration.

At 220 and 230 in FIG. 2, based on the usage data, SDS controller 170 determines a higher usage set of storage resources (see 310) and a lower usage set of storage resources (see 315) from the multiple (N) storage resources. At 240 in FIG. 2, SDS controller 170 instructs hosts 110A-C to use N storage resources in an unbalanced manner by using the higher usage set at a higher usage level compared to the lower usage set.

As used herein, the term "higher usage set" may refer generally to a set of storage resource(s) that is used at a higher usage level compared to the "lower usage set." The term "lower usage set" may refer generally to a set of storage resource(s) that is used at a lower usage level compared to the "higher usage set." The usage level may be defined using any suitable approach, such as based on the usage data discussed using block 210. This way, the higher usage set may reach its wear level limitation faster than (and likely to fail before) the lower usage set. As such, the risk of all N storage resources failing at around the same time may be reduced, if not avoided. Users may foresee and better plan for hardware phase-out and replacement in a staged manner instead of the whole distributed storage system 190 at the same time.

Figure 3:
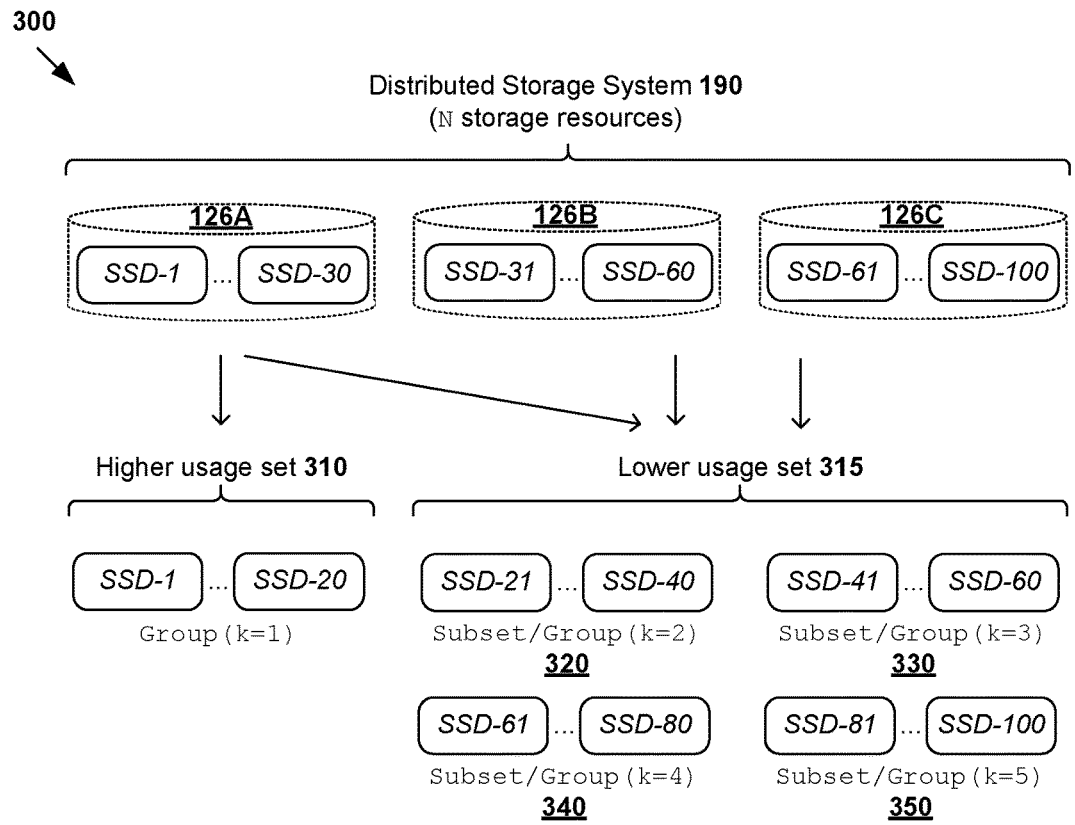
FIG. 3 is a schematic diagram illustrating an example unbalanced storage resource usage configuration for a distributed storage system in a virtualized computing environment.

In the example in FIG. 3, storage resources labelled "SSD-1" to "SSD-20" may be assigned to higher usage set 310, while "SSD-21" to "SSD-100" are assigned to lower usage set 315. As will be described further using FIG. 4, lower usage set 315 may be further divided or assigned into multiple subsets or groups. Depending on the desired implementation, a total of K groups of storage resources may be configured. In this case, "SSD-1" to "SSD-20" in higher usage set 310 may represent a first group (k=1), while "SSD-21" to "SSD-100" in lower usage set 315 further assigned to four different subsets or groups (k=2, 3, 4, 5). See 320-350 in FIG. 3. This way, SDS controller 170 may configure usage of storage resources in lower usage set 315 in an unbalanced manner to further reduce the risk of "SSD-21" to "SSD-100" reaching their wear level limitation and failing at around the same time.

As used herein, the term "use" at block 240 may refer generally to any suitable usage of storage resources 126A-C, such as access of existing data, placement of new data, movement of data, etc. As will be discussed using FIGS. 3-6, block 240 may include SDS controller 170 determining, from lower usage set 315, an inactive subset (e.g., group k=2) and active subset(s) (e.g., groups k=3, 4, 5) for use in an unbalanced manner such that the active subset(s) may be used at a higher usage level compared to the inactive subset. In this case, block 240 may include instructing hosts 110A-C to, for a particular time period, cause the inactive subset to be idle by moving data from the inactive subset to the higher usage set, or to the active subset(s).

Alternatively or additionally, as will be discussed using FIG. 7, block 240 may include instructing hosts 110A-C to, for a particular time period, perform unbalanced data placement by excluding the inactive subset of the lower usage set from the multiple storage resources available for data placement. Here, the "inactive subset" selected to be idle or excluded from data placement may represent a subset of lower usage set 315, or more particularly, one group (k=2, 3, 4, 5) in lower usage set 315.

Figure 6:
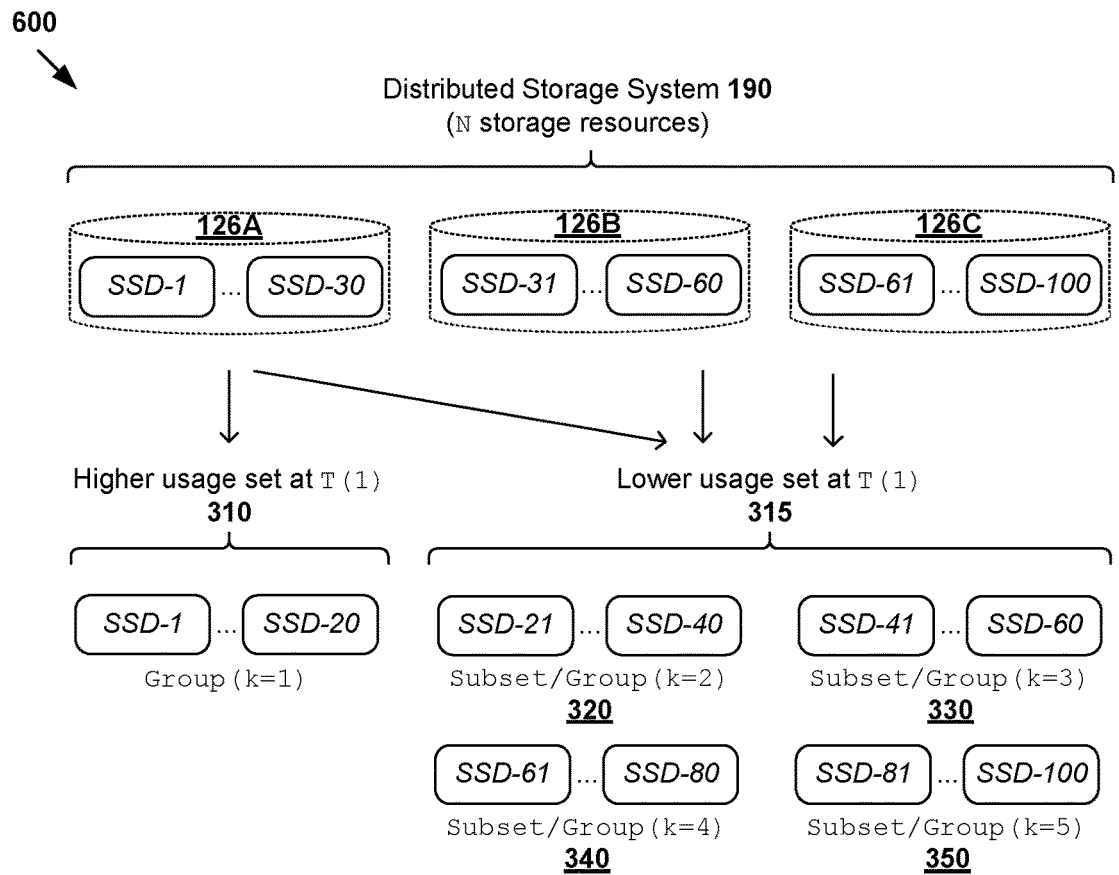
FIG. 6 is a schematic diagram illustrating example dynamic approach for unbalanced storage resource usage configuration for a distributed storage system in a virtualized computing environment.

Depending on the desired implementation, higher usage set 310 and lower usage set 315 may be reconfigured in response to determination that storage resources in higher usage set 310 have been replaced (e.g., after reaching their wear limit) or that a particular time period has elapsed (e.g., dynamic approach in FIG. 6). Reconfiguration may involve determining an updated higher usage set and an updated lower usage set, the updated higher usage set being associated with a higher usage level compared to the updated lower usage set.

Further, as will be discussed using FIG. 8, examples of the present disclosure may be implemented together with a data balancing mechanism. For example, data balancing may be performed by identifying target storage resource(s) based on whether a source storage resource belongs to higher usage set 310 or lower usage set 315. In this case, in response to determination that the source storage resource belongs to the higher usage set, target storage resource(s) from the higher usage set may be selected. Otherwise (i.e., source storage resource belongs to the lower usage set), target storage resource(s) from the higher usage set or lower usage set may be selected. Various examples will be discussed below.

DETAILED EXAMPLES

Figure 4:
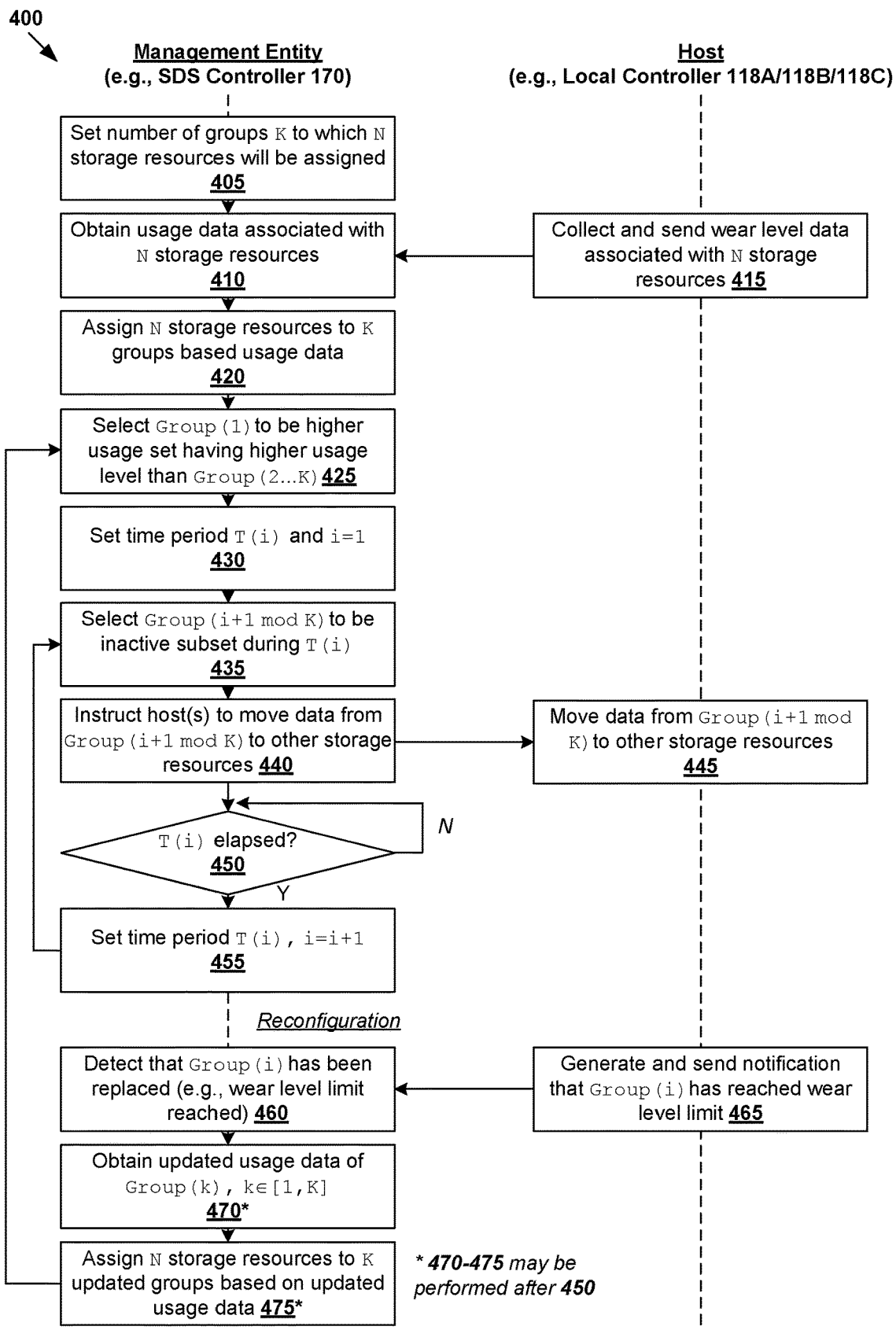
FIG. 4 is a flowchart of a first example detailed process for unbalanced storage resource usage configuration for a distributed storage system in a virtualized computing environment.

FIG. 4 is a flowchart of first example detailed process 400 of unbalanced storage resource usage configuration for distributed storage system 190 in virtualized computing environment 100. Example process 400 may include one or more operations, functions, or actions illustrated by one or more blocks, such as 405 to 475. The various blocks may be combined into fewer blocks, divided into additional blocks, and/or eliminated depending on the desired implementation. In practice, the configuration of groups 310-350 may be transparent to hosts 110A-C in that they are not aware of the different sets and groups.

(a) Initial Configuration

At 405 in FIG. 4, SDS controller 170 sets a number of groups (K) to which N storage resources will be assigned. K may be set based on any suitable parameter(s), such as a percentage (m %) of N storage resources that will reach their wear level limitation first, etc. For example, using m=20% and N=100, 20% of 100 storage resources will wear out faster than the remaining 80%, which is at the expense of losing 20% of performance and capacity of the overall distributed storage system 190. In this case, K=100/20=5 groups may be formed. In practice, it should be understood that N/m may not divided exactly and each group may not have the same number of members. Depending on the desired implementation, m may be set lower (e.g., 5%)

At 410 in FIG. 4, SDS controller 170 obtains usage data associated with N storage resources, such as by retrieving or receiving the usage data from hosts 110A-C (see 415 in FIG. 4), accessing the usage data from any suitable storage, etc. In practice, any suitable usage data may be obtained, such as a current wear level count of each storage resource. Hosts 110A-C may collect the usage data using respective local controllers 118A-C according to any suitable approach, such as by issuing command(s) to a driver or firmware associated with the storage resources, retrieving data (e.g., Self-Monitoring, Analysis and Reporting Technology (S.M.A.R.T.) data, etc.) through Small Computer System Interface (SCSI) commands, etc. The collection may take into account different driver interfaces specified for the storage resources by different manufacturers.

At 420 in FIG. 4, SDS controller 170 assigns N storage resources to K groups based on the usage data. For example, when distributed storage system 190 is set up initially, all N storage resources will have substantially zero wear level count. In this case, N=100 storage resources may be split into K=5 groups. In the example in FIG. 3, 20 storage resources labelled "SSD-1" to "SSD-20" are assigned to a first group (k=1), "SSD-21" to "SSD-40" to a second group (k=2), "SSD-41" to "SSD-60" to a third group (k=4), "SSD61" to "SSD80" to a fourth group (k=4), and "SSD81" to "SSD100" to a second group (k=K=5). See 310-350 in FIG. 3. It should be noted that storage resources assigned to a particular group may be supported by the same host, or different hosts.

At 425 in FIG. 4, SDS controller 170 selects or determines the first group (k=1) to be higher usage set 310 having a higher usage level than lower usage set 315 that includes other groups (k=2, 3, 4, 5) in lower usage set 315. In the example in FIG. 3, the first group (k=1) that includes "SSD-1" to "SSD-20" may be referred to as a set of higher-usage-level or most-used storage resources that will generally reach their wear level limitation first and need to be replaced earlier than the other groups. To further reduce the risk of all storage resources in lower usage set 315 failing at around the same time, unbalanced usage of groups 320-350 (i.e., "SSD-21" to "SSD-100") may be configured as follows.

At 430 and 435 in FIG. 4, when distributed system storage 190 is up and running, SDS controller 170 sets a time period T(i), and selects one group (k=i+1 mod K) to be idle during T(i). In a first time period where i=1, "SSD-21" to "SSD-40" in group (k=2 mod 5=2) form an inactive subset that is configured to be idle. In this case, at 440 and 445 in FIG. 4, SDS controller 170 configures group (k=2) to be idle by instructing one or more hosts 110A-C to move or transfer data stored on "SSD-21" to "SSD-40" to other storage resource(s). For example, the data may be moved to at least one of "SSD-1" to "SSD-20" and "SSD-41" to "SSD-100." At 450 and 455 in FIG. 4, in response to determination that current time period T(i) has elapsed, SDS controller 170 increments i=i+1=2, and repeats blocks 435 and 440 in FIG. 4.

Referring to FIG. 3 again, example unbalanced storage usage configuration schedule 360 specifies how groups 310-350 are used through multiple time periods. At 361 during T(i=1), group (k=2 mod 5=2) is configured to be idle (represented using cross symbol "x") and its data moved to other groups (k=1, 3, 4, 5) that are in use (represented using a tick symbol). The group (e.g., k=2) selected or determined to be idle for a particular time period may be referred to as an "inactive subset," while other groups (k=3, 4, 5) from lower usage set 315 as "active subsets." At 362 in FIG. 3 during T(i=2), group (k=3) is configured to be idle and its data moved to other groups (k=1, 2, 4, 5). At 363 in FIG. 3 during T(i=3), group (k=4) is configured to be idle and its data moved to other groups (k=1, 2, 3, 5). Similarly, at 364 in FIG. 3 during T(i=4), group (k=5) is configured to be idle and its data moved to other groups (k=1, 2, 3, 4).

The above may be repeated in subsequent time periods. For example, group (k=2) is configured to be idle during T(i=5); group (k=3) during T(i=6); group (k=4) during T(i=7); group (k=5) during T(i=8); group (k=2) again during T(i=9); and group (k=3) again during T(i=10). See corresponding 365-370 in FIG. 3. As shown at 380 in FIG. 3, after i=10 time periods have elapsed, group (k=1) would be the most-used group compared to other groups (k=2, 3, 4, 5). By configuring usage of group (k=1) at a higher level compared to other groups, "SSD-1" to "SSD-20" may reach their wear level limitation earlier than other storage resources labelled "SSD-21" to "SSD-100." Again, this reduces the risk of all storage resources failing at substantially the same time.

(b) Reconfiguration

Referring to FIG. 4 again, at 460 in FIG. 4, SDS controller 170 may detect that a particular group has been replaced, such as after the group has reached its wear level limitation or for any other reason(s). For example, once group (k=1) representing higher usage ser 310 has been decommissioned and replaced after reaching its wear level limit, host-A 110A associated with "SSD-1" and "SSD-20" may send a notification to SDS controller 170 at block 465 to facilitate the detection at block 460. For example, new storage resources labelled "SSD-101" to "SSD-120" may be installed to replace "SSD-1" and "SSD-20" in group (k=1). It should be understood that the total number of storage resources (N) may remain the same after the replacement, increase or decrease.

At 470 in FIG. 4, in response to the detection, SDS controller 170 may obtain updated usage data of all storage resources, including "SSD-21" to "SSD-100" from existing groups (k=2, 3, 4, 5) and new "SSD-101" and "SSD-120." At 475 in FIG. 4, based on the updated usage data, SDS controller 170 assign the storage resources to K groups, thereby updating membership of the group(s) in higher usage set 310 and lower usage set 315 (also referred to as "updated higher usage set" and "updated lower usage set"). For example, block 475 may involve sorting the storage resources (e.g., "SSD-21" to "SSD-120") according to their current wear level count. Storage resources with the highest usage level (e.g., wear level count) may be placed in updated group (k=1) such that they will reach their wear level limitation faster compared to other groups. Once the reassignment or reconfiguration is performed, SDS controller 170 then proceeds to perform blocks 425-455, the description of which has been presented above and not repeated here for brevity.

Figure 5A:
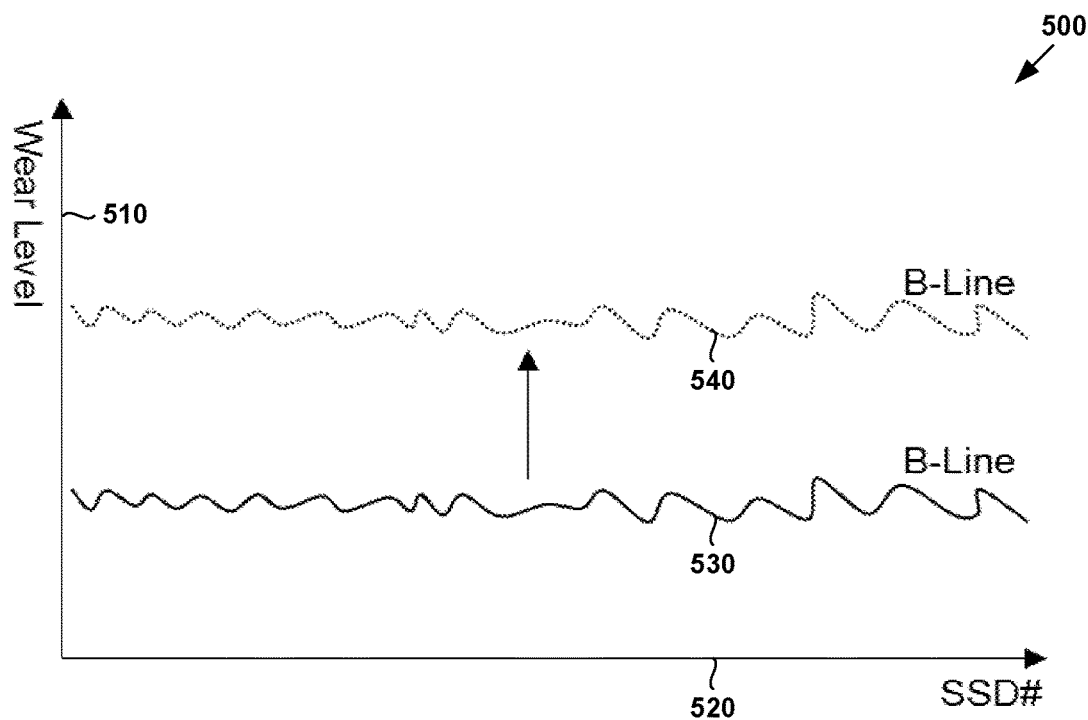
FIG. 5A is a schematic diagram illustrating example wear level count data of storage resources according to a balanced approach for storage resource usage configuration.

Improvements provided by examples of the present disclosure may be observed by comparing FIG. 5A and FIG. 5B as follows. In particular, FIG. 5A is a schematic diagram illustrating example 500 of wear level count data according to a balanced approach for storage resource usage configuration. In this example, the X-axis (see 510) represents the number of SSDs, while the Y-axis (see 520) represents the wear level count of each SSD. At any given time point, each SSD's wear level count is represented by one particular point. By connecting the points associated with respective SSDs, the X-Y coordinate plane may represent an endurance state of distributed storage system 190.

Using conventional balanced approaches, the wear level counts of respective SSDs are relatively "balanced," as represented using B-line (see 530). Initially, the B-line is closer to the X-axis, but will move away from the X-axis over time (see 540). On a particular day when the B-line reaches its wear level limitation (e.g., P/E count), the SSDs will generally fail on the same day or at around the same time. When this occurs, entire distributed storage system 190 will fail.

Figure 5B:
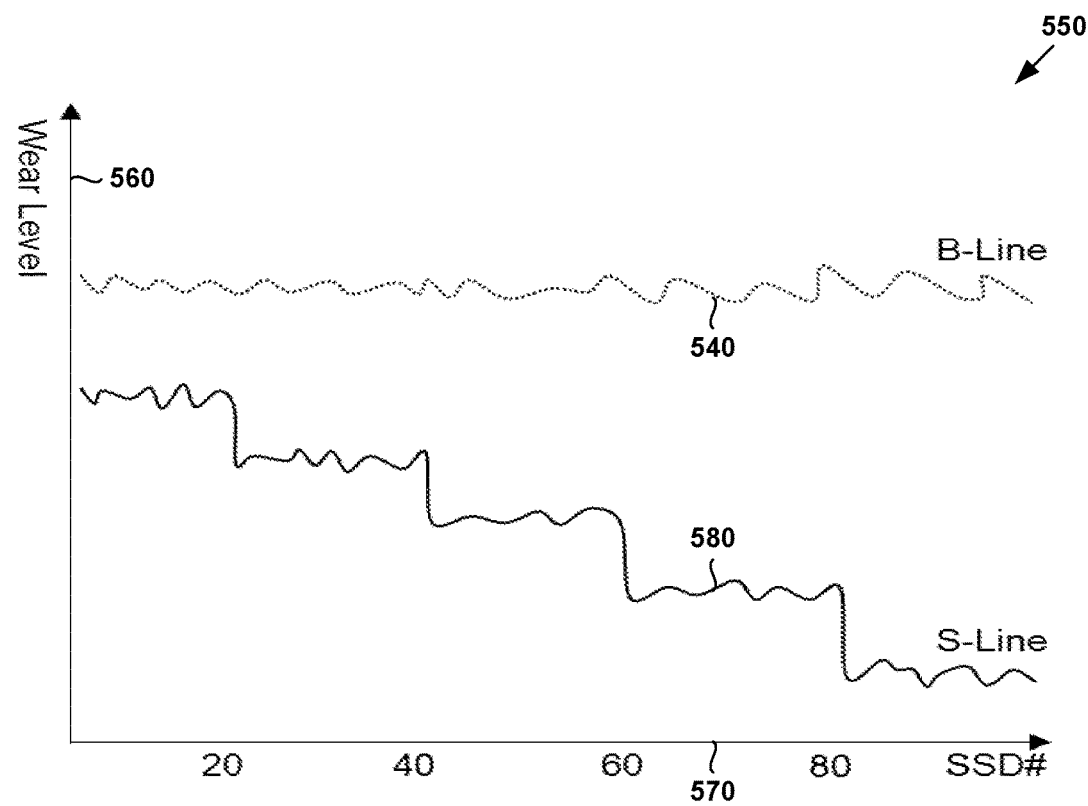
FIG. 5B is a schematic diagram illustrating example wear level count data of storage resources according to an unbalanced approach for storage resource usage configuration.

In contrast, FIG. 5B is a schematic diagram illustrating example 550 of wear level count data of storage resources according to an unbalanced approach for storage resource usage configuration. Similar to FIG. 6A, the X-axis (see 560) in FIG. 6B represents the number of SSDs, while the Y-axis (see 570) represents the wear level count of each SSD. According to the unbalanced approach, a higher usage set of SSDs will be used more, and therefore reach its wear level limitation faster, than a lower usage set of SSDs. In this case, the wear leveling curve may follow a stepped curve (see S-line 580 in FIG. 5B). Once a set of SSDs is replaced, a new set of SSDs will be selected to be used more often than others.

According to examples of the present disclosure, some storage resources will have heavier load compared to others. In some cases, the overall system performance may be affected because, at a particular time period, m % of the total N storage resources (e.g., 20% in FIG. 3) is not in use. As such, the impact on performance may be estimated at a maximum of m %. Also, since heavier load implies more data being moved to those storage resources on average, the impact on system capacity may also be estimated at a maximum of m %. To reduce the impact, m may be configured to be a relatively low value. For example, using m=95%, users will have replace almost all SSDs (e.g., 95 SSDs) in one cycle, which is highly undesirable.

Instead, depending on the desired implementation, m may be configured to facilitate staged hardware failure and replacement. Using m=5% for example, users may only need to replace 5% of the total SSDs in one cycle (i.e., steady and small steps) to reduce the performance and capacity impact. Examples of the present disclosure may be implemented by management entity 170 using the management or control path, generally with little or no changes to the underlying data path connecting hosts 110A-C with distributed storage system 190.

(c) Dynamic Approach

The examples explained using FIG. 3 and FIG. 4 generally work well for storage resources with similar I/O patterns. According to examples of the present disclosure, a dynamic approach for unbalanced storage resource configuration may be performed to consider the effect of different I/O patterns. For example, for storage resources with different I/O patterns, group assignment may be performed at each time period T(i) based on the latest usage data, such as the P/E count of each storage resource, etc. In this case, blocks 470 and 475 may be performed after block 450 in FIG. 4, particularly after T(i) has elapsed but before the next T(i+1) starts.

Some examples will be discussed using FIG. 6, which is a schematic diagram illustrating example dynamic approach 600 for unbalanced storage resource configuration for distributed storage system 190 in virtualized computing environment 100. Similar to the example in FIG. 3, storage resources labelled "SSD-1" to "SSD-20" are assigned to a first group (k=1) representing higher usage set 310 at T(i=1). Further, ""SSD-21" to "SSD-100" in lower usage set 315 are assigned to four different groups (k=2, 3, 4, 5). See 611 in set or group membership information table 610 in FIG. 6.

After time period T(1) has elapsed at block 450 in FIG. 4, SDS controller 170 may retrieve updated usage data associated with N storage resources and assign them to K groups based on the updated usage data according to blocks 470-475. For example, at the end of T(1), the storage resources with the highest P/E count may be "SSD-1" to "SSD-10" from first group (k=1) and "SSD-21" to "SSD-30" from second group (k=2). In this case, the membership of first group (k=2) and second group (k=2) may be updated. As such, at the start of T(2), "SSD-1" to "SSD-10" and "SSD-21" to "SSD-30" are assigned to the first group (k=1), thereby generating or determining updated higher usage set 310. Further, "SSD-11" to "SSD-20" and "SSD-31" to "SSD-40" are assigned to second group (k=2), thereby generating or determining updated lower usage set 315. See 612 in FIG. 6.

After T(2) has elapsed, SDS controller 170 may once again retrieve updated usage data associated with N storage resources to determine whether new group assignment is required. In the example in FIG. 6, reconfiguration is not required and the membership remains unchanged during time periods T(3) and T(4). See 613 and 614 in FIG. 6. After T(4) has elapsed, however, SDS controller 170 may once again update the membership of first group (k=1) based on the latest usage data. In particular, at the start of T(5), "SSD-1" to "SSD-15" and "SSD-21" to "SSD-25 are assigned to the first group (k=1), while "SSD-16" to "SSD-20" and "SSD-26" to "SSD-40" are assigned to the second group (k=2).

According to the above examples, set or group membership may be dynamically updated based on the latest usage data (e.g., I/O patterns). In practice, it should be understood that any storage resource in groups (k=2, 3, 4, 5) in lower usage set 315 may be reassigned to the first group (k=1) based on the updated usage data, and vice versa. This increases the likelihood of storage resources in the first group (k=1) reaching their P/E count limit first and wearing out more quickly than those in other groups. The examples in FIG. 6 may be performed at any suitable time interval, such as every time period or multiple time periods (e.g., every two time periods).

Unbalanced Data Placement

According to examples of the present disclosure, unbalanced storage resource usage configuration may be performed to improve data placement. Here, the term "data placement" may refer generally to a process of determining which storage resource from distributed storage system 190 to store data. For example, the "data" may include new data, such as virtual disks or virtual machine disks (VMDKs) relating to VMs 131-136, home objects, swap objects, snapshots, memory, etc. In practice, data placement may be performed for any suitable scenario, such as when VMs 131-136 are being created during a provisioning process, when an existing VM is provisioned with a new virtual disk, etc.

Figure 7:
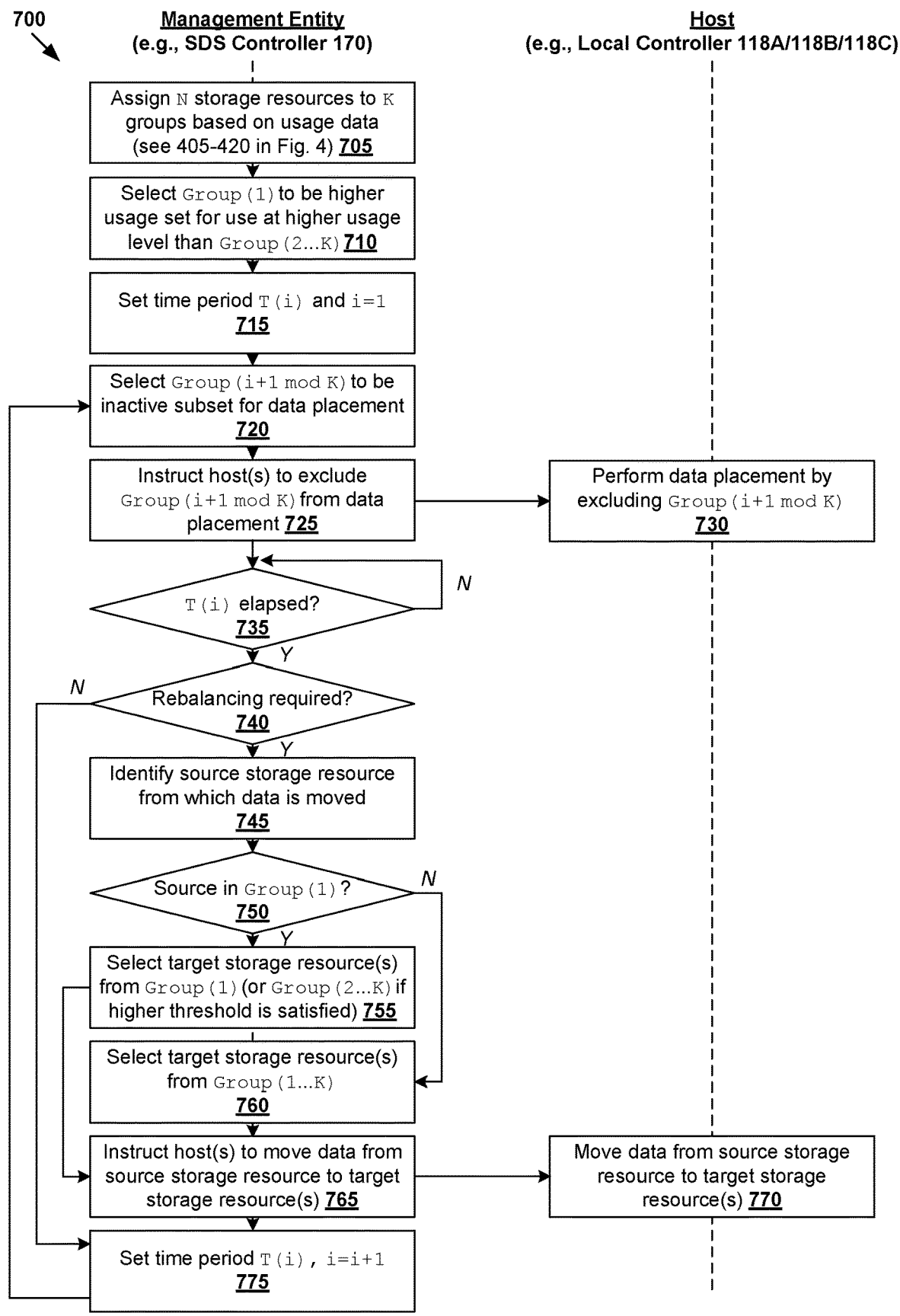
FIG. 7 is a flowchart of a second example detailed process for unbalanced storage resource usage configuration for a distributed storage system in a virtualized computing environment.

FIG. 7 is a flowchart of second example detailed process 700 for unbalanced storage resource usage configuration for distributed storage system 190 in virtualized computing environment 100. Example process 700 may include one or more operations, functions, or actions illustrated by one or more blocks, such as 705 to 775. The various blocks may be combined into fewer blocks, divided into additional blocks, and/or eliminated depending on the desired implementation. In practice, example process 700 may be implemented by SDS controller 170 (e.g., using central control plane module 172), hosts 110A-C (e.g., using respective local controllers 118A-C), etc.

Blocks 705-720 are similar to blocks 405-435, the explanation of which will not be repeated here for brevity. Similar to the examples in FIG. 3 and FIG. 4, N storage resources may be assigned to K groups based on usage data, where the first group (k=1) in higher usage set 310 is configured to have a higher usage level compared to other groups (2≤k≤K) in lower usage set 315. Further, at each time period T(i), a group from lower usage set 315 is configured to be an inactive subset for use at a lower usage level (e.g., excluded from data placement) compared to other group(s) from lower usage set 315.

At 725 and 730 in FIG. 7, a particular time period T(i), SDS controller 170 instructs hosts 110A-C to exclude a particular group configured to be an inactive subset from lower usage set 315 from data placement. For example at T(i=1), SDS controller 170 may instruct host(s) 110A-C to exclude placement of new data on group (k=2) during this time period. This causes hosts 110A-C to select storage resource(s) from groups (k=1, 3, 4, 5) for data placement in response to determination that placement of new data is required. The group (e.g., k=2) selected or determined to be excluded from data placement for a particular time period may be referred to as an "inactive subset," while other groups (k=3, 4, 5) from lower usage set 315 as "active subsets."

Blocks 725-735 may be repeated at subsequent time periods. For example, group (k=3) may be excluded from data placement during T(i=2); group (k=4) during T(i=3); group (k=5) during T(i=4); group (k=2) again during T(i=5); and so on. Since the first group (k=1) is configured to have a higher usage level, it will not be excluded from data placement during these time periods. As such, similar to the examples in FIG. 3, the first group tends to be the most-used group for data placement compared to other groups (k=2, 3, 4, 5). For example, if new data is stored on distributed storage system 190 in a steady manner, group (k=1) may have 1/(m−2) more data than other groups. This way, group (k=1) may reach its wear level limitation earlier, thereby reducing the risk of all storage resources failing at substantially the same time.

Data Rebalancing

Examples of the present disclosure may be used together with any suitable storage technology with a data rebalancing mechanism. For example, using VSAN technology, SDS controller 170 may also implement a Cluster-Level Object Manager (CLOM) that makes decision relating to data placement on different hosts 110A-C and storage resources in virtualized computing environment 100. When data rebalancing is performed, data from one storage resource (i.e., "source") will be moved to other storage resource(s) (i.e., "target"). Some examples will be explained using FIG. 8, which is a schematic diagram illustrating example data rebalancing 800 to facilitate unbalanced storage resource usage configuration according to the example in FIG. 7.

Referring to FIG. 7 again, at 740 and 745, in response to determination that data rebalancing is required, SDS controller 170 identifies a source storage resource from which movement of data is required. At 750 to 755, SDS controller 170 selects target storage resource(s) based on whether the source storage resource belongs to higher usage set 310 (i.e., first group (k=1)) or lower usage set 315 (i.e., any one of groups (k=2, . . . , K)). In the example in FIG. 8, two rebalancing conditions are considered: (A) when a usage level of a storage resource reaches a first predetermined threshold (e.g., 80%), and (B) when a difference between the usage labels of two storage resources exceeds a second predetermined threshold (e.g., 30%). In practice, any additional and/or alternative rebalancing condition(s) may be used at block 740 in FIG. 7.

At 750 (yes) and 755, in response to determination that the source storage resource is from the first group (k=1) forming higher usage set 310, target storage resource(s) may be selected from the first group (k=1) where possible. Otherwise, target storage resource(s) may be selected from other groups (k=2, . . . , K) in lower usage set 315 if a higher threshold or rebalancing condition may be satisfied. In a first example (see 810 in FIG. 8), in response to determination that a usage level of "SSD-1" in group (k=1) exceeds the first predetermined threshold (e.g., 80%), SDS controller 170 selects "SSD-2" from the same group to be a target storage resource.

In a second example (see 820 in FIG. 8), in response to determination that a usage level difference between "SSD-3" and "SSD-4" in in group (k=1) exceeds the second predetermined threshold (e.g., 30%), SDS controller 170 selects "SSD-4" from the same group to be a target storage resource to which data will be moved. In contrast, in a third example (see 830 in FIG. 8), no storage resource in group (k=1) is selected as a target. In this case, SDS controller 170 determines whether a higher threshold (e.g., 60% difference) compared to the second predetermined threshold (e.g., 30% difference) is satisfied before data is moved from "SSD-12" in group (k=1) to "SSD-22" in group (k=2).

Referring to FIG. 7 again, at 750 (no) and 760, in response to determination that the source is from group (k=2, ..., K), target storage resource(s) may be selected from higher usage set 310 or lower usage set 315. In other words, target storage resource(s) may be selected from all groups including the first group, i.e., k=1, ..., K. For example (see 840 in FIG. 8), in response to determination that a usage level of "SSD-61" in group (k=4) exceeds the first predetermined threshold (e.g., 80%), SDS controller 170 selects "SSD-53" and "SSD-54" from group (k=3) to be target storage resources. In a further example (see 850 in FIG. 8), in response to determination that a usage level difference between "SSD-90" in group (k=5) and "SSD-20" in group (k=1) exceeds the second predetermined threshold (e.g., 30%), SDS controller 170 instructs hosts 110A-C to move data to the first group.

Figure 8:
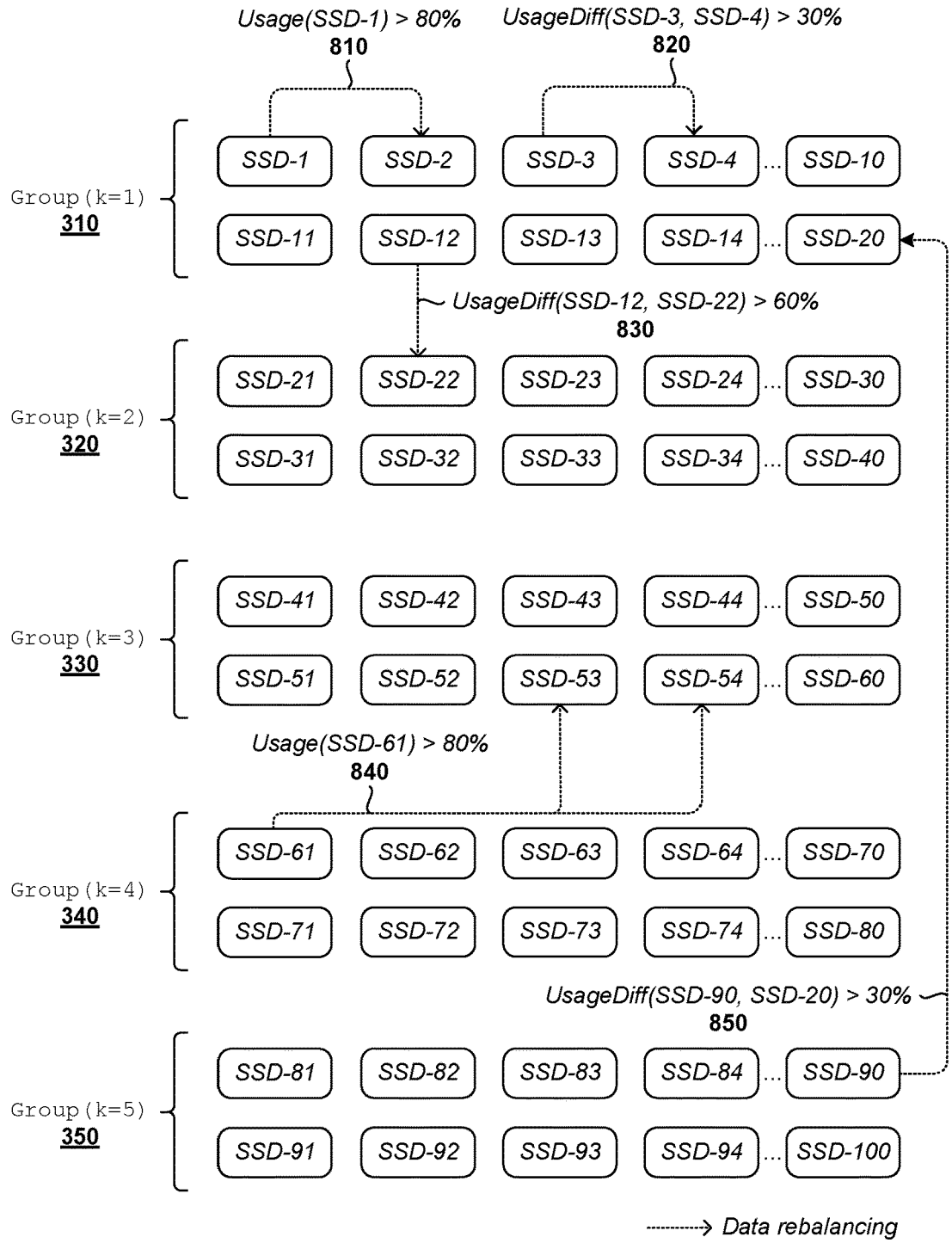
FIG. 8 is a schematic diagram illustrating example data rebalancing to facilitate unbalanced storage resource usage configuration according to the example in FIGS. 7.

Using the examples in FIG. 7 and FIG. 8, storage resources in the first group will tend to have a higher usage level (e.g., wear level count) compared to other groups. Although not shown in FIG. 7 for simplicity, reconfiguration according to blocks 455-475 in FIG. 4 and the dynamic approach explained using FIG. 6 may be implemented together with the examples in FIG. 7 and FIG. 8.

Container Implementation

Although explained using VMs 131-136, it should be understood that virtualized computing environment 100 may include other virtual workloads, such as containers, etc. As used herein, the term "container" (also known as "container instance") is used generally to describe an application that is encapsulated with all its dependencies (e.g., binaries, libraries, etc.). In the example in FIG. 1, container technologies may be used to run various containers inside respective VMs 131-136. Containers are "OS-less", meaning that they do not include any OS that could weigh 10 s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 8. For example, a computer system capable of acting as host 110A/110B/110C or SDS controller 170 may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a management entity to perform unbalanced storage resource usage configuration for a distributed storage system in a virtualized computing environment that includes the management entity and multiple hosts, wherein the method comprises:
obtaining usage data associated with multiple storage resources forming the distributed storage system, wherein the multiple storage resources are supported by the multiple hosts;

based on the usage data, determining a higher usage set of one or more storage resources from the multiple storage resources;

based on the usage data, determining a lower usage set of one or more storage resources from the multiple storage resources;

configuring the multiple hosts to use the multiple storage resources in an unbalanced manner by using the higher usage set of one or more storage resources at a higher usage level compared to the lower usage set of one or more storage resources, wherein the lower usage set further includes an inactive subset of storage resources and at least one active subset of storage resources; and instructing the multiple host to, for a particular period, move data from the inactive subset of storage resources in the lower usage set to the higher usage set, or to the at least one active subset of storage resources in the lower usage set.

2. The method of claim 1, wherein configuring the multiple hosts comprises:

determining, from the lower usage set, the inactive subset of storage resources and the at least one active subset of storage resources for use in an unbalanced manner such that the at least one active subset of storage resources is used at a higher usage level compared to the inactive subset of storage resources.

3. The method of claim 2, wherein configuring the multiple hosts comprises:

instructing the multiple hosts to, for a particular time period, perform data placement in an unbalanced manner by excluding the inactive subset of storage resources from the multiple storage resources available for data placement.

4. The method of claim 1, wherein the method further comprises:

based on updated usage data associated with the multiple storage resources, determining an updated higher usage set of one or more storage resources and an updated lower usage set of one or more storage resources, wherein the updated higher usage set of one or more storage resources is associated with a higher level of usage compared to the updated lower usage set of one or more storage resources.

5. The method of claim 4, wherein determining the updated higher usage set and the updated lower usage set comprises:

determining that (a) the higher usage set has been replaced, or (b) a particular time period has elapsed.

6. The method of claim 1, wherein the method further comprises:

determining whether data balancing is required; and in response to determination that data balancing is required, identifying a source storage resource from the multiple storage resources;

in response to determination that the source storage resource belongs to the higher usage set, selecting one or more target storage resources from the higher usage set; or in response to determination that the source storage resource belongs to the lower usage set, selecting one or more target storage resources from the higher usage set or lower usage set; and instructing, at least one of the multiple hosts, to move data from the source storage resource to the one or more target storage resources.

7. A non-transitory computer-readable storage medium that includes a set of instructions which, in response to execution by a processor of a computer system, cause the processor to perform a method of unbalanced storage resource usage configuration for a distributed storage system in a virtualized computing environment, wherein the method comprises:

obtaining usage data associated with multiple storage resources forming the distributed storage system, wherein the multiple storage resources are supported by the multiple hosts;

based on the usage data, determining a higher usage set of one or more storage resources from the multiple storage resources;

based on the usage data, determining a lower usage set of one or more storage resources from the multiple storage resources;

configuring the multiple hosts to use the multiple storage resources in an unbalanced manner by using the higher usage set of one or more storage resources at a higher usage level compared to the lower usage set of one or more storage resources, wherein the lower usage set further includes an inactive subset of storage resources and at least one active subset of storage resources; and instructing the multiple host to, for a particular period, move data from the inactive subset of storage resources in the lower usage set to the higher usage set, or to the at least one active subset of storage resources in the lower usage set.

8. The non-transitory computer-readable storage medium of claim 7, wherein configuring the multiple hosts comprises:

determining, from the lower usage set, the inactive subset of storage resources and the at least one active subset of storage resources for use in an unbalanced manner such that the at least one active subset of storage resources is used at a higher usage level compared to the inactive subset of storage resources.

9. The non-transitory computer-readable storage medium of claim 8, wherein configuring the multiple hosts comprises:

instructing the multiple hosts to, for a particular time period, perform data placement in an unbalanced manner by excluding the inactive subset of storage resources from the multiple storage resources available for data placement.

10. The non-transitory computer-readable storage medium of claim 7, wherein the method further comprises:

based on updated usage data associated with the multiple storage resources, determining an updated higher usage set of one or more storage resources and an updated lower usage set of one or more storage resources, wherein the updated higher usage set of one or more storage resources is associated with a higher level of usage compared to the updated lower usage set of one or more storage resources.

11. The non-transitory computer-readable storage medium of claim 10, wherein determining the updated higher usage set and the updated lower usage set comprises:

determining that (a) the higher usage set has been replaced, or (b) a particular time period has elapsed.

12. The non-transitory computer-readable storage medium of claim 7, wherein the method further comprises:

determining whether data balancing is required; and in response to determination that data balancing is required, identifying a source storage resource from the multiple storage resources;

in response to determination that the source storage resource belongs to the higher usage set, selecting one or more target storage resources from the higher usage set; or in response to determination that the source storage resource belongs to the lower usage set, selecting one or more target storage resources from the higher usage set or lower usage set; and instructing, at least one of the multiple hosts, to move data from the source storage resource to the one or more target storage resources.

13. A computer system, comprising:

a processor; and a non-transitory computer-readable medium having stored thereon instructions that, when executed by the processor, cause the processor to:

obtain usage data associated with multiple storage resources forming a distributed storage system, wherein the multiple storage resources are supported by multiple hosts in a virtualized computing environment;

based on the usage data, determine a higher usage set of one or more storage resources from the multiple storage resources;

based on the usage data, determine a lower usage set of one or more storage resources from the multiple storage resources;

configure the multiple hosts to use the multiple storage resources in an unbalanced manner by using the higher usage set of one or more storage resources at a higher usage level compared to the lower usage set of one or more storage resources, wherein the lower usage set further includes an inactive subset of storage resources and at least one active subset of storage resources; and instruct the multiple host to, for a particular period, move data from the inactive subset of storage resources in the lower usage set to the higher usage set, or to the at least one active subset of storage resources in the lower usage set.

14. The computer system of claim 13, wherein the instructions for configuring the multiple hosts cause the processor to:

determine, from the lower usage set, the inactive subset of storage resources and the at least one active subset of storage resources for use in an unbalanced manner such that the at least one active subset of storage resources is used at a higher usage level compared to the inactive subset of storage resources.

15. The computer system of claim 14, wherein the instructions for configuring the multiple hosts cause the processor to:

instruct the multiple hosts to, for a particular time period, perform data placement in an unbalanced manner by excluding the inactive subset of storage resources from the multiple storage resources available for data placement.

16. The computer system of claim 13, wherein the instructions further cause the processor to:

based on updated usage data associated with the multiple storage resources, determine an updated higher usage set of one or more storage resources and an updated lower usage set of one or more storage resources, wherein the updated higher usage set of one or more storage resources is associated with a higher level of usage compared to the updated lower usage set of one or more storage resources.

17. The computer system of claim 16, wherein the instructions for determining the updated higher usage set and the updated lower usage set comprises:

determine that (a) the higher usage set has been replaced, or (b) a particular time period has elapsed.

18. The computer system of claim 13, wherein the instructions further cause the processor to:

determine whether data balancing is required; and in response to determination that data balancing is required, identify a source storage resource from the multiple storage resources;

in response to determination that the source storage resource belongs to the higher usage set, select one or more target storage resources from the higher usage set; or in response to determination that the source storage resource belongs to the lower usage set, select one or more target storage resources from the higher usage set or lower usage set; and instruct, at least one of the multiple hosts, to move data from the source storage resource to the one or more target storage resources.

* * * * *